Feb. 9, 1932. W. K. QUEEN 1,844,903
MULTIPLE STAGE ROD PACKING
Filed Dec. 31, 1929 4 Sheets-Sheet 2
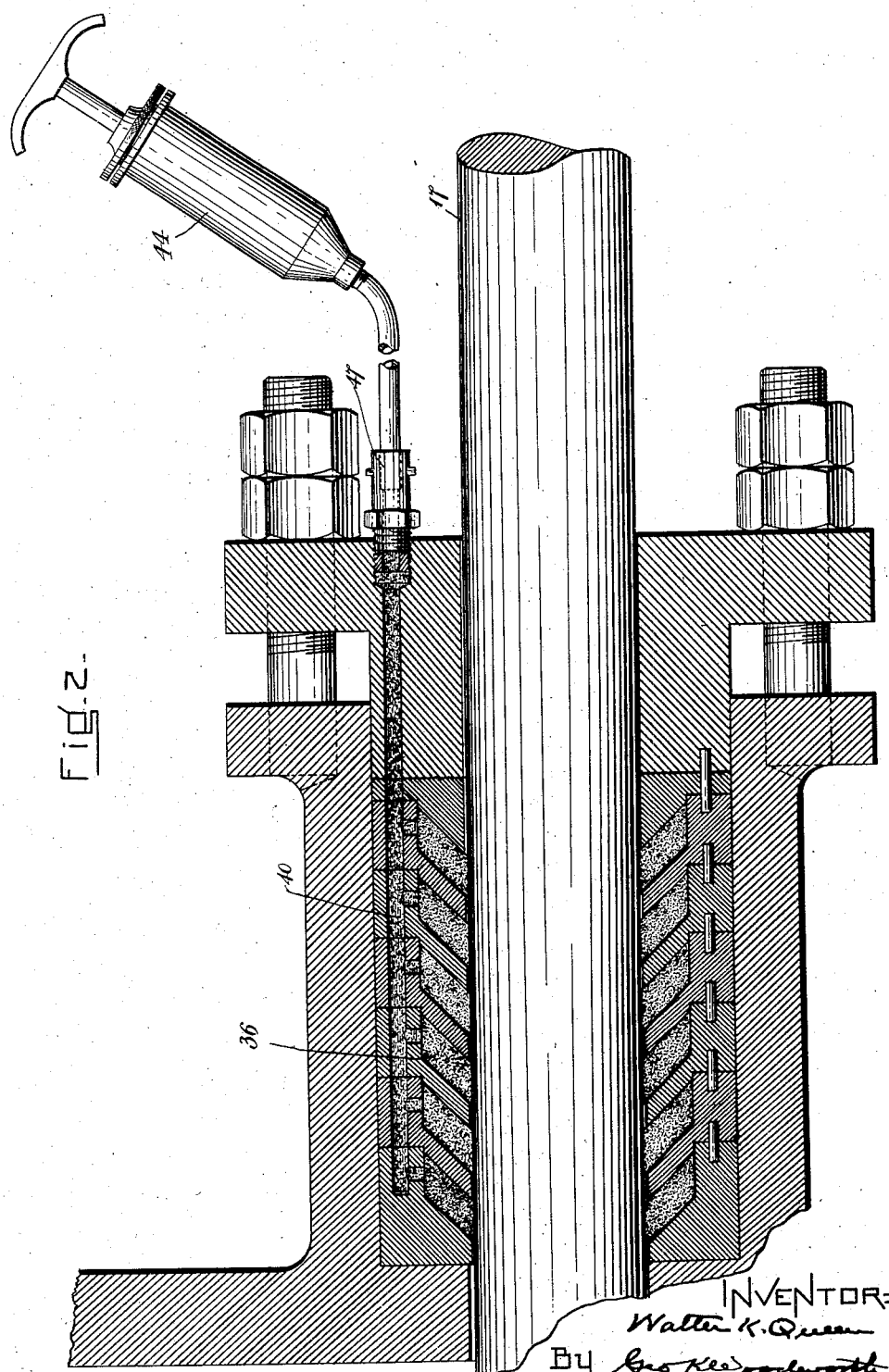

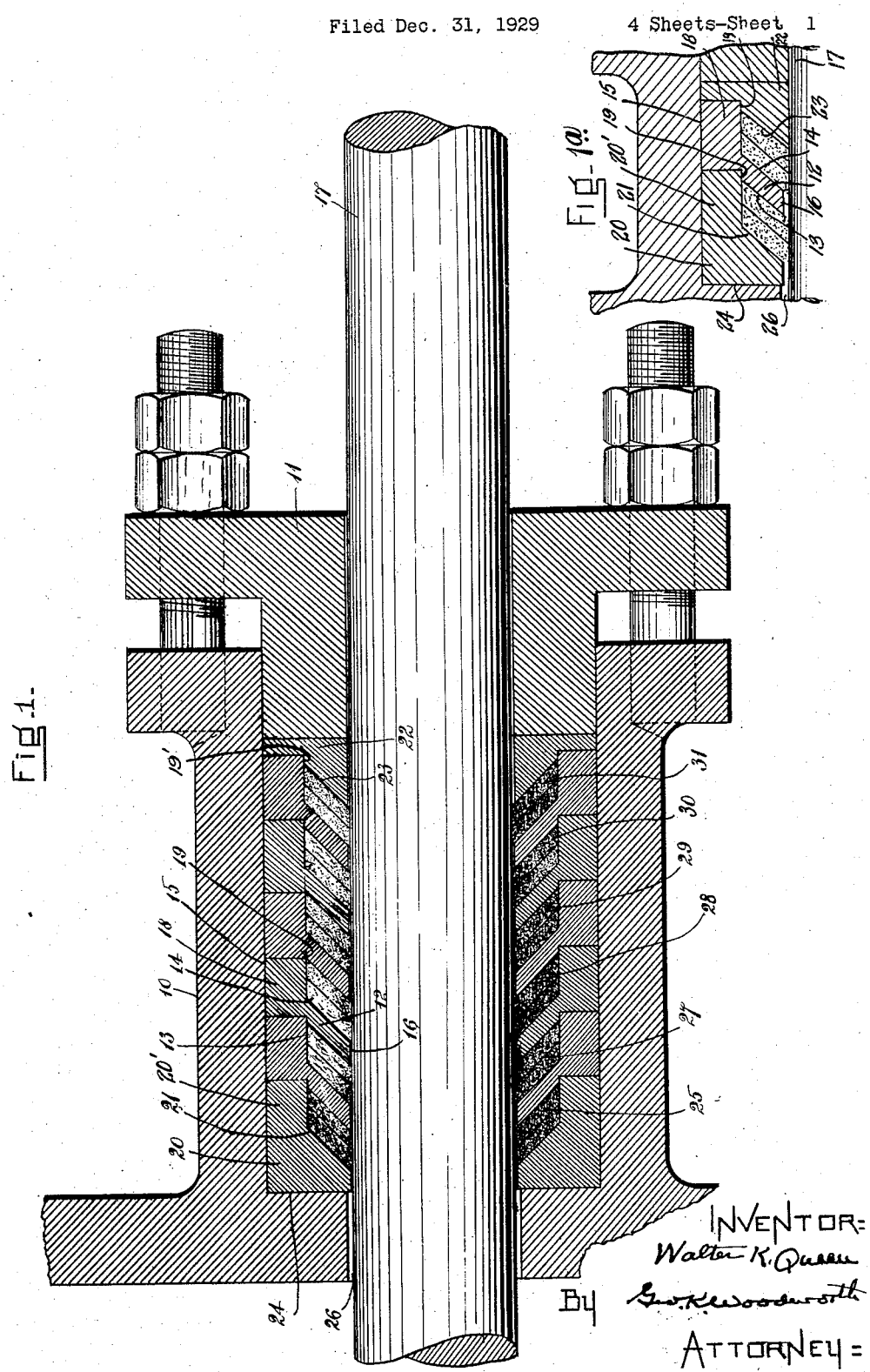

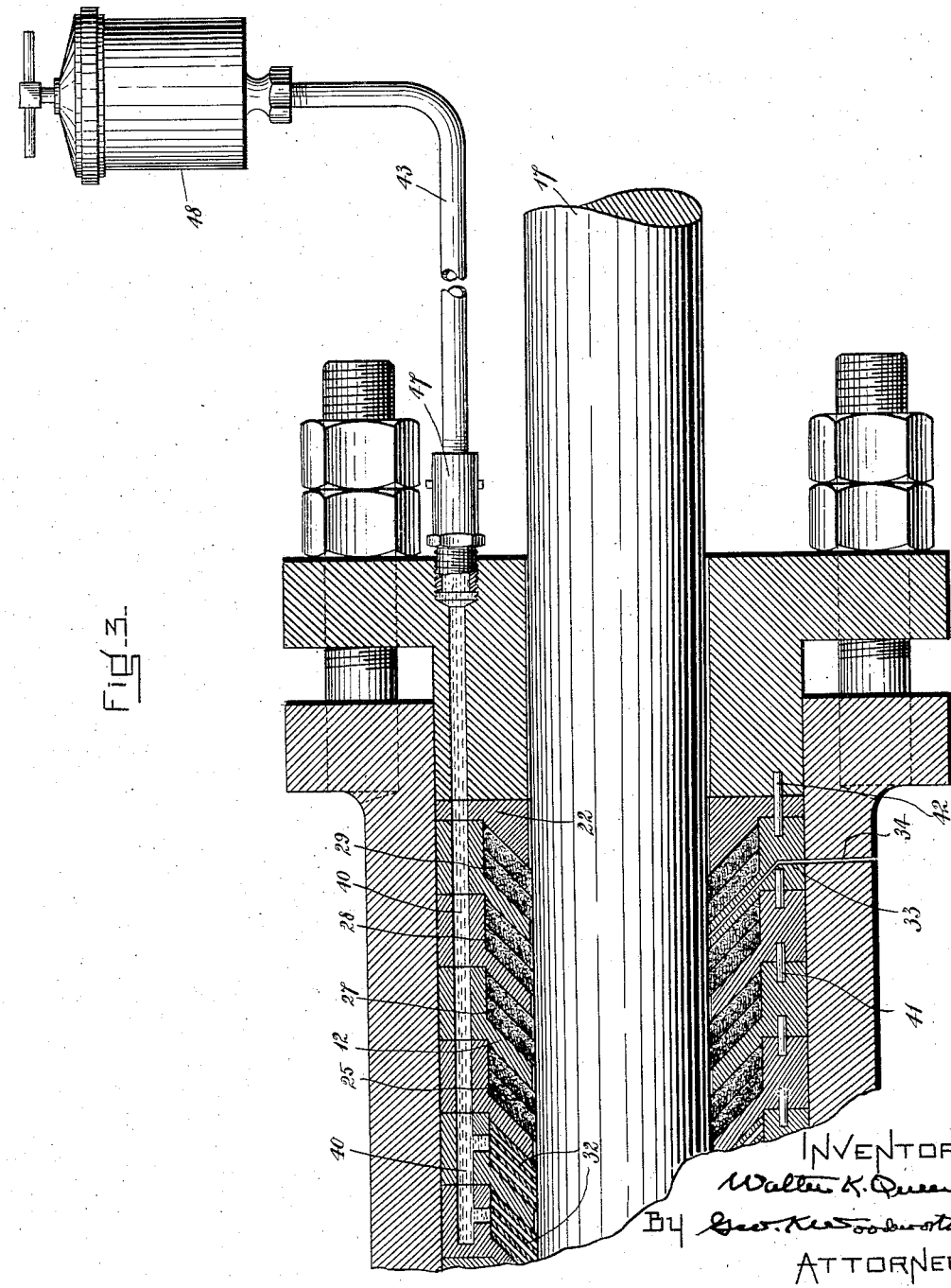

Feb. 9, 1932.  W. K. QUEEN  1,844,903
MULTIPLE STAGE ROD PACKING
Filed Dec. 31, 1929  4 Sheets-Sheet 4
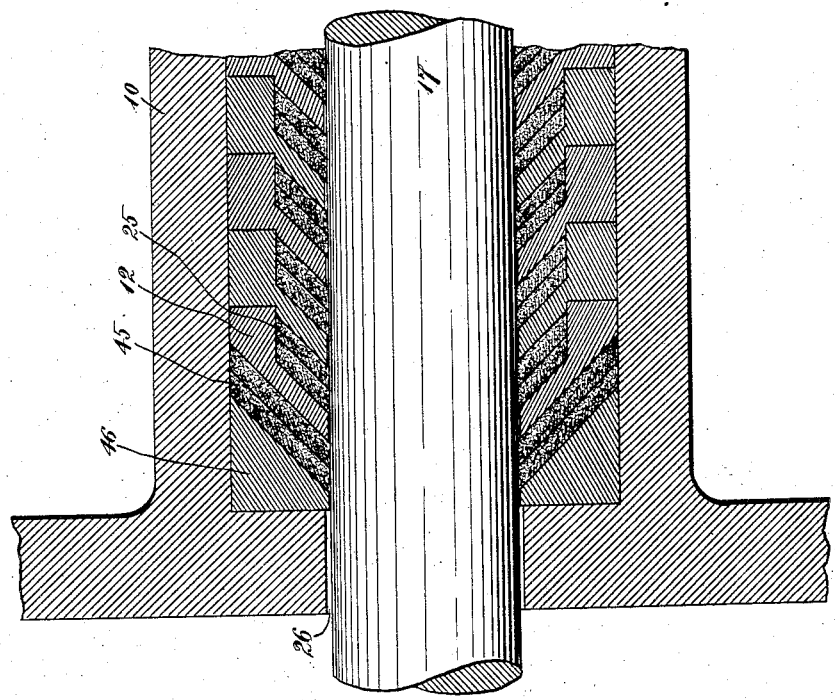
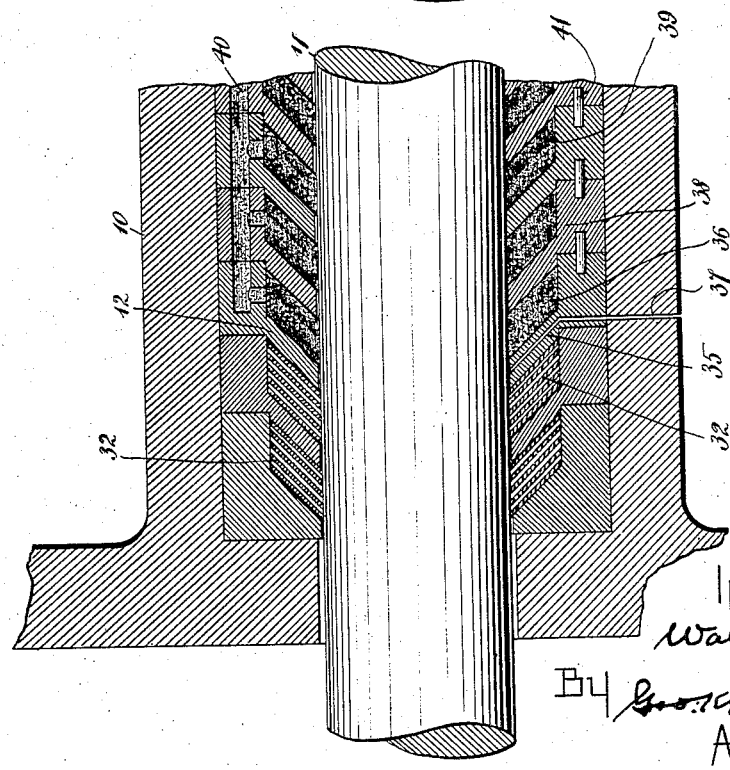

Patented Feb. 9, 1932

1,844,903

UNITED STATES PATENT OFFICE

WALTER K. QUEEN, OF NEEDHAM HEIGHTS, MASSACHUSETTS

MULTIPLE STAGE ROD PACKING

Application filed December 31, 1929. Serial No. 417,707.

My invention relates to rod-packing for steam engine piston rods, pump piston rods, governor rods, plungers of plunger elevators and the like, and certain features of my invention relate particularly to packing for rods that are to be packed against high pressure steam, water, air, or other fluid.

The general object of my invention is to improve and simplify the construction, and increase the efficiency and prolong the life, of rod packing.

The special objects of my invention are to provide a multiple-stage rod-packing in which the various stages act successively from the direction of the source of pressure; to provide means for reducing the volume of leakage from the source of pressure along the piston rod; to provide means such as a leak-off duct disposed between two stages to relieve the pressure on a given stage caused by leakage past the stage next preceding; and to provide a duct through the members separating the several stages through which a fluid such as a lubricant or plastic packing may be conveyed.

With the foregoing and other objects in view, my invention comprises a stuffing box which preferably is provided with rings at either end, that at the inner end, or the end nearer the source of pressure, having a conical depression formed in its inner face and the other, at the outer end having its outer face in the form of a truncated cone, one or more conical separators placed between said rings and at least two sets of packing rings or masses of packing material arranged on either side of the separating member and between said member and the ends of the stuffing box, or between said member and said rings, if the latter are employed.

My invention comprises also a novel form of separator which preferably has an outer convex conical surface and an inner concave conical surface and is provided with a cylindrical flange portion parallel to the axis of said surfaces. Preferably the said flange portion is perforated so that when a series of said separators are properly positioned the said perforations form a passageway for the introduction of a fluid.

My invention also comprises means such as metallic washers placed forwardly of a multistage packing for the purpose of reducing the volume of leakage along the rod from the source of pressure. My invention comprises further the parts and combinations of parts hereinafter more fully described and set forth in the appended claims.

In the drawings which accompany and form a part of this specification and are to be regarded as merely illustrative and not restrictive, I have shown several practical embodiments of my invention; but it is to be understood that various modifications may be made therein without departing from the invention as set forth in the appended claims.

In the drawings—

Figure 1 is a central longitudinal section of a rod-packing embodying my invention and having six stages of packing;

Fig. 1a is a fragmentary central longitudinal section of a multi-stage rod-packing having only two packing stages.

Fig. 2 is a similar section of a modification in which plastic packing is employed.

Fig. 3 is a fragmentary section of a further modification showing the use of metallic washers forwardly of a plurality of packing rings.

Figs. 4 and 5 are fragmentary sections of two other modifications.

In the particular drawings selected for more fully disclosing my invention 10 is a stuffing box provided with the usual gland 11 and enclosing separators 12 herein shown as five in number, although it will be understood that one only may be used. Each separator has an outer convex conical surface 13 and an inner concave conical surface 14, the outer periphery 15 thereof closely fits the wall of the stuffing box and the inner periphery 16 of each separator is spaced slightly away from the rod 17 which is to be packed. Preferably the outer portion of each separator is in the form of a cylindrical flange 18, each such flange abutting those of the separators next adjacent thereto and being substantially parallel to the axis of the surfaces 13, 14. As shown in Fig. 1 shoulder 19 may be cut in the outer surface 13 of each separator to accommodate the end of the adjacent flange.

Within the space between each pair of adjacent separators, the inner periphery of the flange and the rod to be packed are placed either packing rings or packing material which are in contact with the rod 17, the inner periphery of each separator being spaced slightly away from said rod. If one separator only is used the packing material obviously will be disposed between the separator and the respective ends of the stuffing box, I prefer to provide the ends of the stuffing box with rings, the ring 20 at the inner end having a conical depression 21 formed in its inner face and the other ring 22 having its outer face 23 in the form of a truncated cone. A shoulder 19' is cut in the outer face 23 of the outer ring 22, and the inner ring 20 is provided with a cylindrical flange 20'. The abutting cylindrical flanges of the separators constitute means for preventing deformation of the spaces between each pair of adjacent separators, or between the outer separator and the outer ring 22, while the abutting flanges of the inner ring 20 and the inner separator constitute means for preventing deformation of the space between said inner separator and inner ring, when the gland 11 is tightened. It follows, therefore, that said spaces are fixed with the result, as hereinafter more fully set forth, that the packing rings act successively as mutually independent units.

The contacting surfaces 24 of the ring 20 and inner end wall of the stuffing box may both be ground accurately to make a pressure-tight fit or a gasket (not shown) may be employed between these surfaces. However, if the construction shown in Fig. 5 is employed this is not necessary.

In Fig. 1 I have shown packing rings 25, 27—31 disposed between each pair of adjacent separators and between the end rings and the two end separators adjacent thereto, respectively. While five separators are shown in this figure, it is to be understood that I do not limit myself to any particular number thereof, and that one only can be employed, in which case there will be a packing ring on either side of such separator, thereby forming a two-stage self-setting packing, as shown in Fig. 1a. The packing rings may be of asbestos or of any other suitable material when the stuffing box is used to prevent the leakage of steam, or they may be made of vulcanized cotton and rubber or other suitable material when used to prevent the leakage of water, saturated steam, or compressed air, containing moisture, and other low temperature fluids. It is to be understood of course that my invention is not limited to the type of packing rings employed.

As fully explained in the patent Klingloff 1,044,787, November 19, 1912, each ring is ineffective until the inner portion thereof which, as aforesaid, projects slightly beyond the inner peripheries of the separators and end rings is acted upon by steam or other pressure by way of the annular space 26, whereupon the edge of the ring subject to such pressure will be forced into firm contact with the rod 17 and prevent leakage of the fluid pressure. Referring to Fig. 1 it will be obvious that when first used the innermost ring 25 only is subject to the fluid pressure and that the succeeding rings are relatively loose in their respective spaces. As soon, however, as the innermost ring becomes worn there will be a certain amount of leakage along the piston rod to the following ring 27, whereupon the action of the fluid pressure on the projecting inner edges of said ring will press the same firmly against the rod and prevent leakage past that ring. When this occurs there is, however, sufficient pressure on the ring 25 to cause it to act as a partial seal. Eventually the rings 28, 29 and 30 are acted upon by the fluid pressure which leaks past the ring preceding in which case there is a differential pressure on each of the forwardly placed rings which is sufficiently high to make each of them act as a partial seal. Finally the outer ring 31 is forced into contact with the rod by the successive breakdown of the preceding rings and in this case there is sufficient pressure on the preceding rings to cause each to act as a partial seal. When finally the wear on the outermost ring 31 permits leakage past the same along the rod and out of the stuffing box, the differential pressures on all six sets of rings will be sufficient for a while to pack the rod against excessive leakage.

In order to prolong the life of the packing I provide one or more sets of metallic washers 32, as shown in Fig. 3, arranged forwardly of the rings 25, 27, etc. and between them and the source of pressure, more especially in cases of very high pressures and where the rod 17 has a very high speed of revolution. The metallic washers 32 reduce the volume of leakage along the rod 17. Generally speaking such washers make an absolute seal but even where they do not and there is a certain amount of leakage past them, the packing 25 acts as a seal as soon as there is leakage past the metallic washers which is effective to force the washer 25 against the rod, and, as above explained, the packing rings 27, 28 and 29 successively come into play and each in turn acts as a seal, or as a partial seal, when the ring preceding it becomes sufficiently worn to permit of leakage. When the ring 29 becomes worn enough to permit of leakage past it, the pressure on the ring 25, although reduced, and not as high as the pressure on the metallic packing 32 is still high enough to cause said packing 25 to act as a partial seal. However, if one of the separators 12 is provided with a leak-off duct 33 extending from its inner to its outer periphery and registering with a radial duct 34 extending from the inner to the outer periphery of the stuffing box, the life of the packing is still further prolonged because such duct will carry off the leakage, in the present instance past the metal washers 32 and the packing rings 25, 27 and 28, and thereby reduce the pressure exerted on the packing ring 29. Two or more such leak-off ducts may be employed if desired and need not necessarily be located as shown in Fig. 3 immediately forward of the last packing ring.

In that form of my invention shown in Fig. 4 a leak-off duct 35 is placed in the separator following the second set 32 of metallic washers. The packing material shown in the spaces between the separators following the metallic washers is plastic packing 36, hereinafter more fully described, but it is to be understood that the operation is the same with packing used such as described in connection with Fig. 1. In the operation of the packing shown in Fig. 4 the metal washers, although having great wear resistive properties with rods having high speeds of revolution under great pressure, will wear in time and permit a certain amount of leakage which is prevented from passing further along the rod by the packing 36. Now, if the leak-off 35 were not employed, as soon as the minute annular space between the rod and the inner periphery of the separator 12 became filled with the fluid which leaked past the washers 32, the pressure on the packing 36 would become as great as the initial pressures on said washers. By relieving such pressure, however, through the duct 35 and the registering duct 37 in the stuffing box, the pressure which the packing 36 and the successive packings 38, 39, etc., have to resist is reduced, thereby increasing the period during which they will remain effectively operative.

Referring again to Fig. 3, it will be noted that the separators shown therein and some of the separators shown in Fig. 4 are provided with a longitudinal duct 40 extending through a cylindrical flange thereof and substantially parallel to the axis of the conical surfaces of each separator. Means are provided for preventing relative rotative movement of said separators when said ducts are in register, such means being shown in the present instance as the dowels 41, while the entire system, including the outer conical ring 22, which is also provided with a duct, is prevented from turning with respect to the stuffing box by means of the dowel 42. In Fig. 3 a lubricant may be introduced into the passageway formed by the ducts 40 by way of the pipe 43 to the metallic washers 32 to reduce the friction between the same and the piston rod. In Fig. 4, however, said duct is employed as shown in Fig. 2 for introducing plastic packing material from a grease gun 44 or other adaptable appliance, such plastic packing material after entering the fixed spaces between adjacent separator rings forming and constituting packing rings. In the appended claims the term "packing ring" is employed to cover pre-formed rings, such as shown at 25 in Fig. 1, or rings formed by plastic packing material injected into the spaces between the separators, such as shown at 36 in Fig. 2. Plastic packing suitable for this purpose consists of pulverized asbestos or graphite, or shredded lead or shredded aluminum mixed with graphite, wax or grease, and the like, and constitutes no part of the present invention. A check valve 47 is shown interposed between the grease gun 44 and also between the receptacle 48 containing lubricant, respectively, and the duct 40.

In order to obviate the necessity of employing a gasket between the ring 20 and the inner wall of the stuffing box or of grinding the surfaces thereof to make a pressure-tight joint, I may employ cone shaped packing rings 45, as shown in Fig. 5, extending from the inner periphery of the stuffing box to the rod 17 and interposed between the innermost separator 12 and the ring 46, the inner face of which is provided with a conical depression formed in its inner face, said rings becoming effective when their inner ends are acted upon by pressure through the annular space 26.

It will be noted that in the preferred forms of my invention shown in Figs. 3 and 4, I provide two safeguards for preventing the premature destruction of the rings which are particularly applicable to abnormally high pressures of the order of 1000 lbs. per square inch, for example: pressures between 1000 and 5000 lbs. per square inch. These are metallic washers 32 of bearing metal or other suitable material which constitute the first two packing stages, followed by one or more stages of packing rings or plastic packing material, and leak-off or relief ducts which, as shown, may be variously located and one or more employed, although only one is shown in each of said figures. A metallic packing reduces the volume of leakage which otherwise would act on the packing ring 29 in Fig. 3, or the masses of packing material 36, etc. in Fig. 4, and the function of the leak-off duct to drain off a certain portion of such leakage and still further reduce the amount thereof which otherwise would act on the rings or packing material placed rearwardly of said duct, thus reducing the pressure which otherwise would act deleteriously upon the same. By providing my multi-stage packing with these safeguards the same can be used effectively with the abnormal pressures above specified which otherwise would cut through the packing and render the same useless.

Having thus described illustrative embodiments of my invention without, however, limiting the same thereto, what I claim and desire to secure by Letters Patent is—

1. A rod packing having a plurality of successively-acting mutually-independent units, each said unit consisting of a packing ring having the form of a truncated cone at its outer end and a conical depression at its inner end, a stuffing box, said packing rings being disposed in said stuffing box with their outer ends directed toward the inner end of said stuffing box and their inner peripheries in contact with the rod to be packed, a separator disposed in said stuffing box between said packing rings, said separator having an outer convex conical surface and an inner concave conical surface, the outer periphery of said separator closely fitting said stuffing box, the inner periphery thereof being slightly spaced away from the rod to be packed and the outer surface thereof being directed toward the inner end of said stuffing box, and means for preventing deformation of the spaces on either side of said separator whereby said packing rings are held loosely in said spaces and act successively as independent units.

2. A rod packing having a plurality of successively-acting mutually-independent units, each unit consisting of a packing ring having the form of a truncated cone at its outer end and a conical depression at its inner end, a stuffing box, said packing rings being disposed in said stuffing box with their outer ends directed toward the inner end of said stuffing box and their inner peripheries in contact with the rod to be packed, a plurality of separators disposed in said stuffing box, each between a pair of said packing rings, each said separator having an outer convex conical surface and an inner concave conical surface, the outer periphery of each said separator closely fitting said stuffing box, the inner periphery thereof being slightly spaced away from the rod to be packed and the outer surface thereof being directed toward the inner end of said stuffing box, and means for preventing deformation of the spaces on either side of said separators whereby said packing rings are held loosely in said spaces and act successively as independent units.

3. A rod packing having a plurality of successively-acting mutually independent units, each said unit consisting of a packing ring having the form of a truncated cone at its outer end and a conical depression at its inner end, a stuffing box, an end ring having a conical depression in its inner face and disposed in said stuffing box at the inner end thereof with its inner face directed away from the inner end of the said stuffing box, a second end ring having its outer face in the form of a truncated cone and disposed in said stuffing box at the outer end thereof with its outer face directed toward the inner end of said stuffing box, said packing rings being disposed in said stuffing box with their outer ends directed toward the inner end of said stuffing box and their inner peripheries in contact with the rod to be packed, a plurality of separators disposed in said stuffing box, each between a pair of said packing rings, each said separator having an outer convex conical surface and an inner concave conical surface, the outer periphery of each said separator closely fitting said stuffing box, the inner periphery thereof being slightly spaced away from the rod to be packed and the outer surface thereof being directed toward the inner end of said stuffing box, and means for preventing the deformation of the spaces between each pair of adjacent separators and between the said end rings and the two separators adjacent thereto, respectively, whereby said packing rings are held loosely in said spaces and act successively as independent units.

4. A multiple-stage self-setting rod-packing comprising in combination a stuffing box, a ring having a conical depression formed in its inner face, said ring being constructed and arranged to fit said stuffing box at one end thereof and surround the rod to be packed, a second ring constructed and arranged to fit said stuffing box at the other end thereof and surround the rod to be packed, said second ring having its outer face in the form of a truncated cone, a plurality of conical separators interposed between said rings, said separators being provided with registering longitudinal channels and at least one of said separators having a transverse channel communicating with the longitudinal channel thereof, means for preventing relative rotative movement between said separators, and a plurality of packing rings, each having the form of a truncated cone at one end and a cone shaped depression at the opposite end, said packing rings being disposed between each pair of adjacent separators and between the said rings and the two end separators adjacent thereto, respectively.

5. A multiple-stage self-setting rod-packing comprising in combination a stuffing box, a plurality of conical separators therein, said separators being provided with registering longitudinal channels and each having a transverse channel communicating with the longitudinal channel thereof, means for preventing relative rotative movement between said separators, means for introducing fluid into the passageway formed by said registering channels, and a plurality of packing rings, each having the form of a truncated cone at one end and a cone shaped depression at the opposite end, said packing rings being disposed between each pair of adjacent separators and between the two end separators and the ends of said box, respectively.

6. A multiple-stage self-setting rod-packing comprising in combination a stuffing box, a plurality of separators thereon, each having an outer convex conical surface and an inner concave conical surface the outer periphery of each of said separators closely fitting said stuffing box and the inner periphery thereof being slightly spaced away from the rod to be packed, each of said separators being provided with a cylindrical flange portion parallel to the axis of said conical surfaces, the flange portion of each of said separators abutting the flange portion of the separators next adjacent thereto, and packing material disposed in the space between each pair of adjacent separators, the inner periphery of said flange portions and the rod to be packed said packing material projecting slightly beyond the inner periphery of each of said separators.

7. A multi-stage self-setting rod-packing comprising in combination a stuffing box, a plurality of conical separators therein, said separators being provided with registering longitudinal channels and each having a transverse channel communicating with the longitudinal channel thereof, means for preventing relative rotative movement between said separators, a plurality of conical metallic packing rings, said metallic packing rings being disposed between one pair of adjacent separators, and means for introducing lubricant into the passageway formed by said registering longitudinal channels.

8. A multi-stage self-setting rod-packing comprising in combination a stuffing box, a plurality of conical separators therein, all of said separators being provided with registering longitudinal channels and one of said separators having a transverse channel communicating with the longitudinal channel thereof, means for preventing relative rotative movement between said separators, a plurality of conical metallic packing rings, said metallic packing rings being disposed between the separator having the transverse channel aforesaid and the next adjacent separator, packing material disposed between the other pairs of adjacent separators and between one of said separators and the end of said stuffing box, and means for introducing lubricant into the passageway formed by said registering longitudinal channels.

9. A multi-stage self-setting rod-packing comprising in combination a stuffing box, a plurality of conical separators therein, said separators being provided with registering longitudinal channels, and each having a transverse channel communicating with the longitudinal channel thereof, means for preventing relative rotative movement between said separators, and means for introducing plastic packing material into the passageway formed by said registering longitudinal channels and through the transverse channel of each of said separators, and into the spaces between pairs of adjacent separators.

10. A multi-stage self-setting rod-packing comprising in combination a stuffing box, a longitudinal channel in said stuffing box, a plurality of conical separators in said stuffing box, said separators being provided with registering longitudinal channels, the channels so formed being in register with the longitudinal channel in said stuffing box, and at least one of said separators having a transverse channel communicating with the longitudinal channel thereof, means for preventing relative rotative movement between said separators and between said separators and said stuffing box, and means for introducing fluid into the longitudinal channel in said stuffing box.

11. A multi-stage self-setting rod-packing comprising in combination a stuffing box provided with a duct extending from the inner to the outer periphery thereof, a separator therein having an outer convex conical surface and an inner concave conical surface, the outer periphery of said separator closely fitting said stuffing box and the inner periphery thereof being slightly spaced away from the rod to be packed, the said separator being being provided with a leak-off duct extending from the inner to the outer periphery thereof and registering with said duct in said stuffing box, and two packing rings each having the form of a truncated cone at one end and a conical depression at the opposite end, said packing rings being disposed on either side of said separator and between the same and the ends of said stuffing box, and projecting slightly beyond the inner periphery of said separator.

In testimony whereof, I have hereunto subscribed my name this 30th day of Dec., 1929.

WALTER K. QUEEN.